June 23, 1925.
H. NIELSEN
LATHE CENTER
Filed Feb. 28, 1924
1,542,827
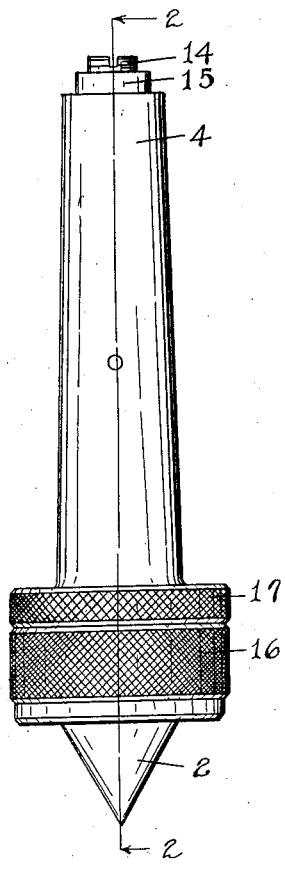
Fig. I.
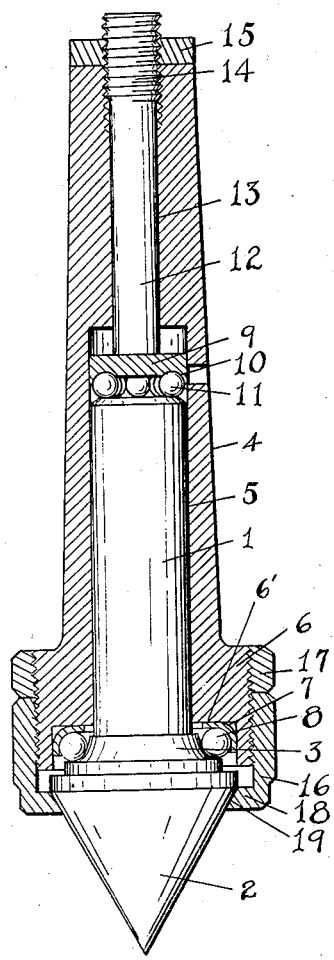
Fig. II.
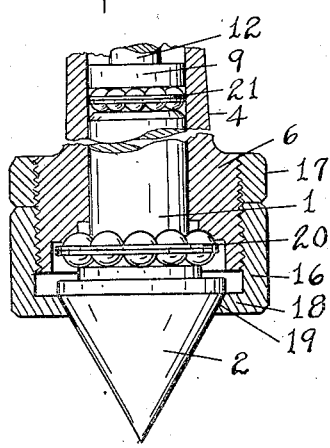
Fig. III.
INVENTOR
Holger Nielsen
BY Chappell & Earl
ATTORNEYS Patented June 23, 1925.

1,542,827

UNITED STATES PATENT OFFICE.

HOLGER NIELSEN, OF LAWTON, MICHIGAN.

LATHE CENTER.

Application filed February 28, 1924. Serial No. 695,711.

*To all whom it may concern:*

Be it known that I, HOLGER NIELSEN, a citizen of the United States, residing at Lawton, county of Van Buren, State of Michigan, have invented certain new and useful Improvements in Lathe Centers, of which the following is a specification.

This invention relates to improvements in lathe centers.

The main objects of this invention are:

First, to provide an improved lathe center in which the spindle is supported so that it is free from chatter and vibration, is capable of carrying heavy loads and may be adjusted to compensate for wear and also in assembling.

Second, to provide an improved lathe center in which the bearing parts are effectively housed and also one in which the bearings are so arranged that they may be easily machined or formed.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side view of my improved lathe center.

Fig. II is a longitudinal section on a line corresponding to line 2—2 of Fig. I, the spindle being shown in full lines and also the support for the thrust bearing at the inner end of the spindle.

Fig. III is a fragmentary view mainly in longitudinal section of a modified form or embodiment of my invention.

In the drawing the sectional views are taken looking in the direction of the little arrows at the ends of the section lines and similar numerals of reference refer to similar parts in all of the views.

My improved lathe center comprises a spindle 1 which is cylindrical or of uniform diameter except that it is provided with the conical tip or head 2 at the base of which is formed a ball race 3, this being formed in a shoulder in the base of the tip. This ball race is external so that it may be readily machined and ground.

The holder 4 is adapted to fit into the tail stock of a lathe and is provided with a longitudinal bearing 5 for the spindle 1, the spindle being a loose fit therein. At its outer end the holder has a head or enlargement 6 provided with an internal shoulder 6' on which the bearing member 7 is seated. The bearing balls 8 coact with the bearing members 3 and 7 which constitute radial and thrust bearings for the spindle.

I provide a thrust bearing member 9, this being in the form of a disk or plate and having a ball race 10 therein for the balls 11 which engage or coact with the inner end of the spindle as shown. This bearing member 9 is adjustably supported by means of the supporting member 12 arranged in the longitudinal bore 13, the bore being threaded at its outer end to receive the threaded portion 14 of the support. A lock nut 15 secures the support in its adjusted position.

The spindle is retained in its bearings by means of the collar 16 threaded upon the enlarged portion of the holder for adjustment thereon and secured in its adjusted positions by the lock nut 17. The collar is provided with an inturned flange 18 internally beveled at 19 to fit the taper of the tip.

With the parts thus arranged the spindle is supported radially and axially and may be very accurately adjusted in its bearings, which is of advantage in assembling and also to take up wear, the spindle being supported so that it does not vibrate or chatter.

One manner of adjusting is to loosen the clamping nut 17, turning the retaining collar 16 down until it engages the tip tight enough to prevent free rotation thereof, the bearing 9 being eased off to permit this. The bearing 9 is then adjusted and locked in its adjusted position. The sleeve 16 is then eased off sufficiently to permit free rotation of the spindle and is locked by means of the lock nut 17.

It will be found that by this method very accurate and rapid adjustment is possible. A further advantage is that the bearings are well protected by the retaining sleeve.

In the modified construction shown in

Fig. III the bearing balls are provided with catches shown at 20 and 21.

Having thus described my invention what I claim as new and desire to secure by Letters Patent is:

1. A lathe center comprising a spindle of uniform diameter having a conical tip and shouldered at the base of the tip providing a ball race, a spindle holder having a longitudinal bearing for said spindle internally shouldered at its outer end providing a ball race, coacting bearing balls providing a combined radial and thrust bearing for said spindle, a thrust bearing member disposed at the inner end of said spindle bearing, balls coacting with the end of the spindle, a thrust bearing member support disposed longitudinally of and threaded into the inner end of said holder, a lock nut for said support, a retaining collar for said spindle threaded upon the outer end of the holder and having an inwardly projecting internally beveled flange embracing said conical tip, and a lock nut for said collar threaded upon said collar.

2. A lathe center comprising a spindle of uniform diameter having a conical tip and shouldered at the base of the tip providing a ball race, a spindle holder having a longitudinal bearing for said spindle internally shouldered at its outer end providing a ball race, coacting bearing balls providing a combined radial and thrust bearing for said spindle, a thrust bearing member disposed at the inner end of said spindle bearing, balls coacting with the end of the spindle, a thrust bearing member support disposed longitudinally of and threaded into the inner end of said holder, and a retaining collar for said spindle upon the outer end of the holder.

3. A lathe center comprising a spindle having a conical tip and provided with an external ball race at the base of the tip, a spindle holder having an internal ball race at its outer end, coacting bearing balls, a thrust bearing member disposed at the inner end of said spindle bearing, balls carried thereby coacting with the end of the spindle, a thrust bearing member support disposed longitudinally of and threaded into the inner end of said holder, a lock nut for said support, a retaining collar for said spindle threaded upon the outer end of the holder and having an inwardly projecting internally beveled flange embracing said conical tip, and a lock nut for said collar threaded upon said collar.

4. A lathe center comprising a spindle having a conical tip and provided with an external ball race at the base of the tip, a spindle holder having an internal ball race at its outer end, coacting bearing balls, a thrust bearing member disposed at the inner end of said spindle bearing, balls carried thereby coacting with the end of the spindle, an adjustable thrust bearing member support, and a retaining collar for said spindle upon the outer end of the holder.

In witness whereof, I have hereunto set my hand.

HOLGER NIELSEN.